No. 851,263. PATENTED APR. 23, 1907.
B. W. TUCKER.
BOXING MACHINE.
APPLICATION FILED FEB. 8, 1904.
10 SHEETS—SHEET 1.
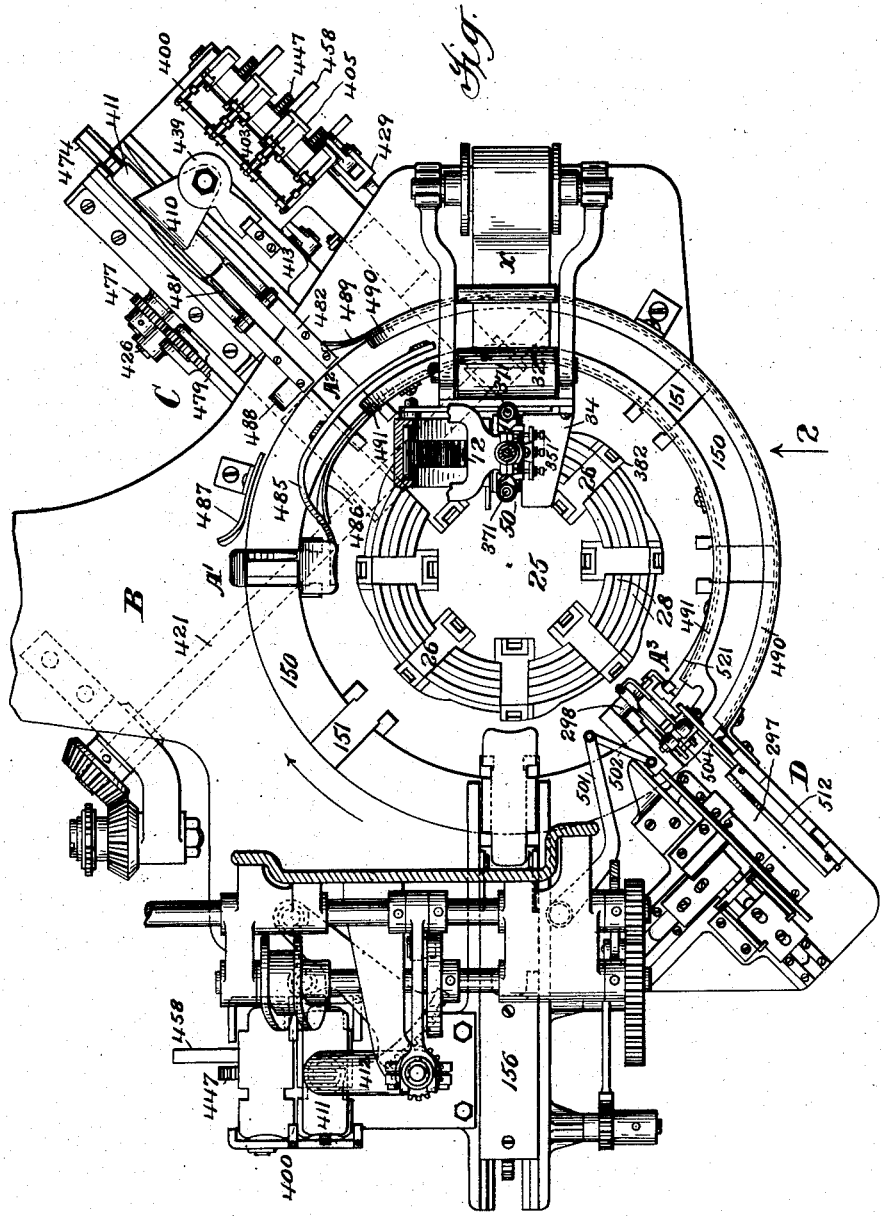
Attest:
P. B. Philipp
O. F. Kehoe
Inventor:
Benjamin W. Tucker
by Philipp Sawyer Rice Kennedy
Attys

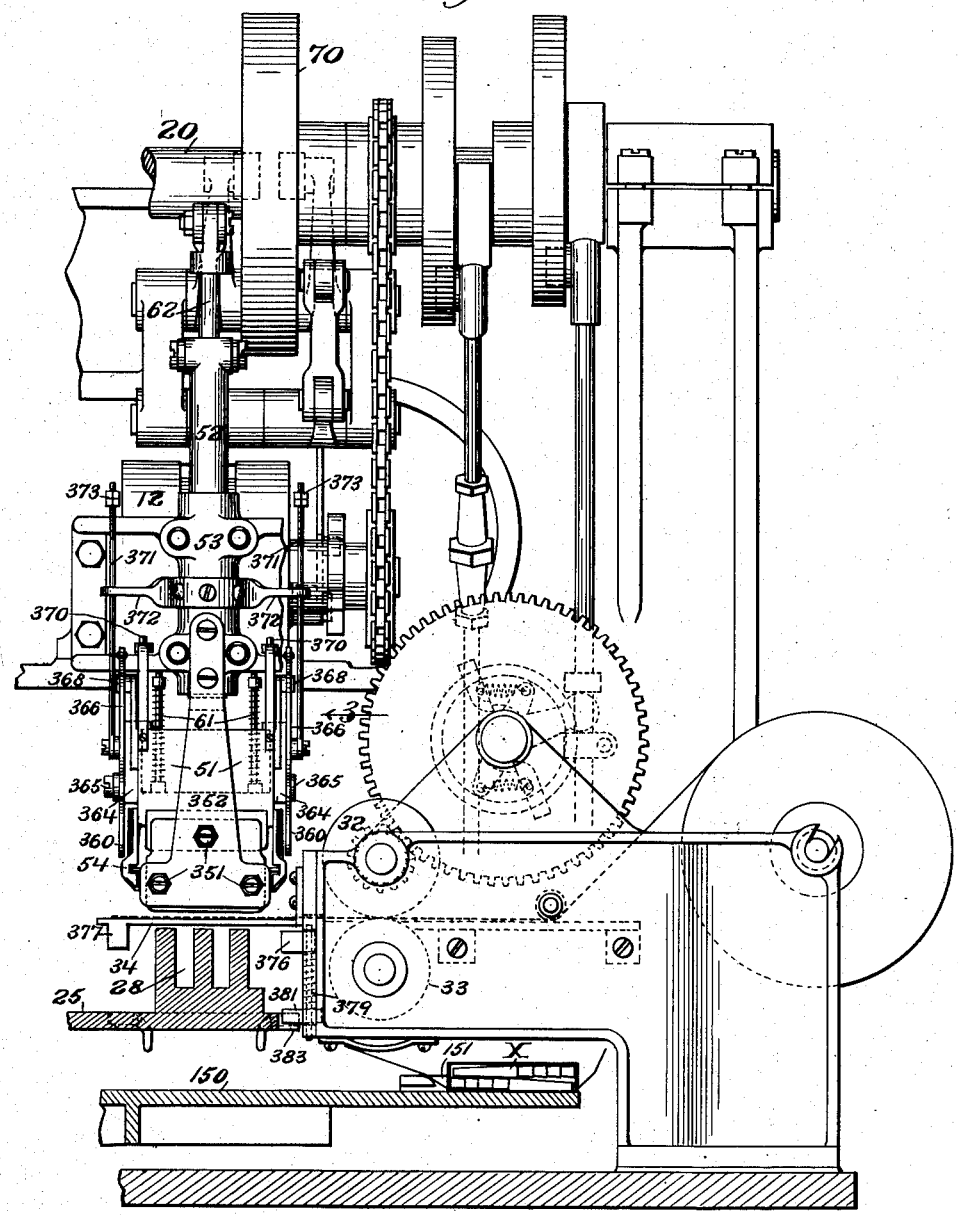

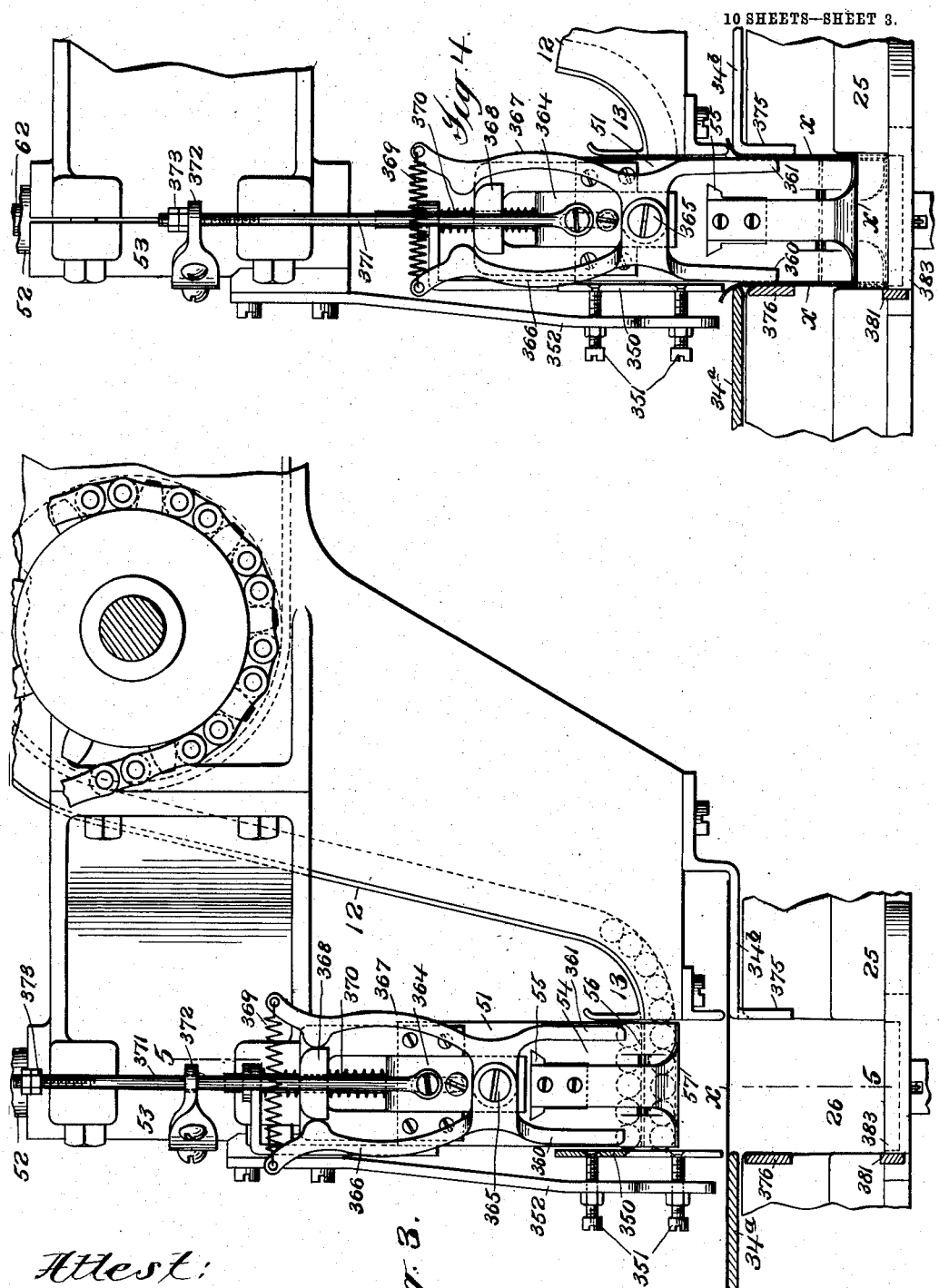

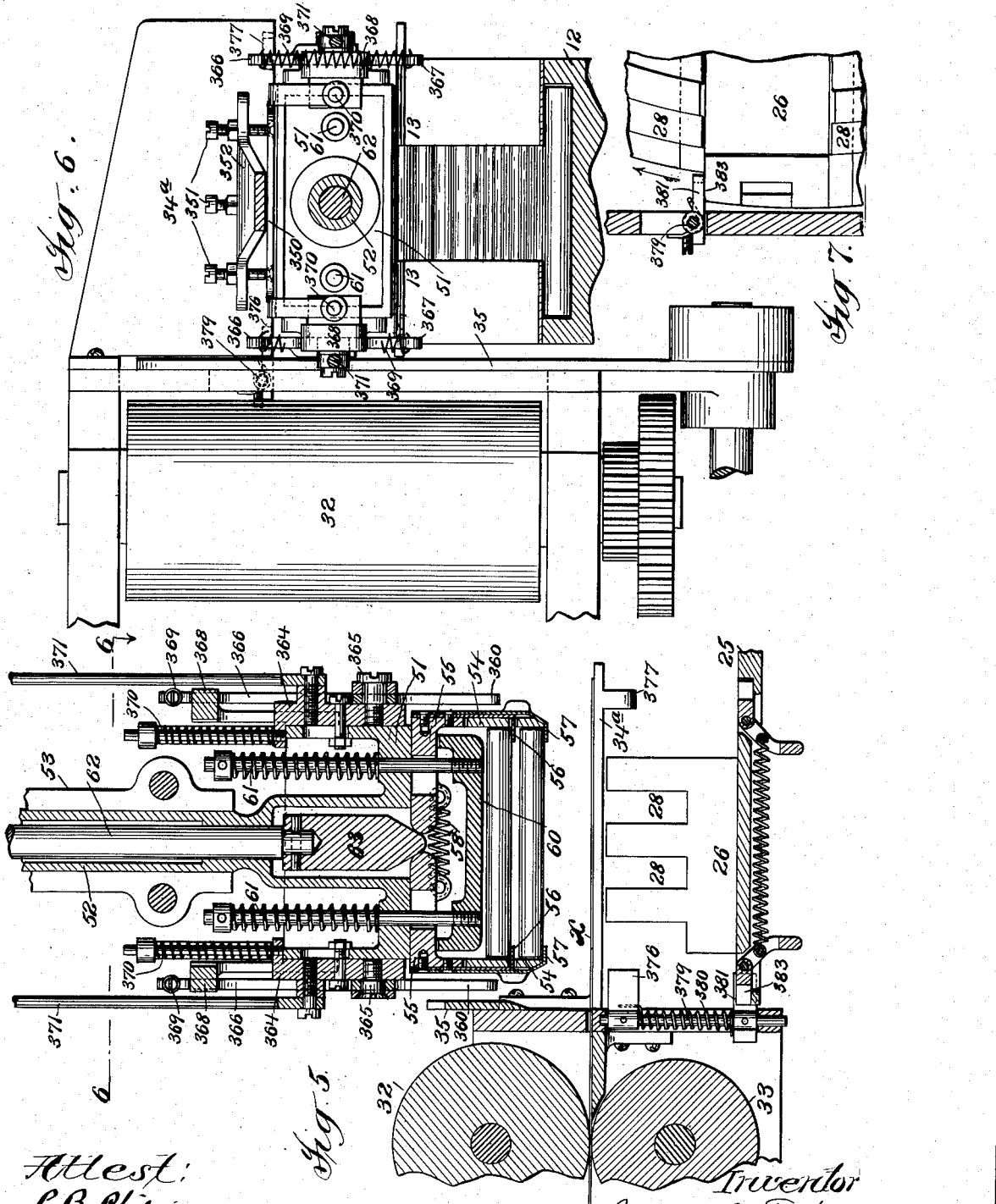

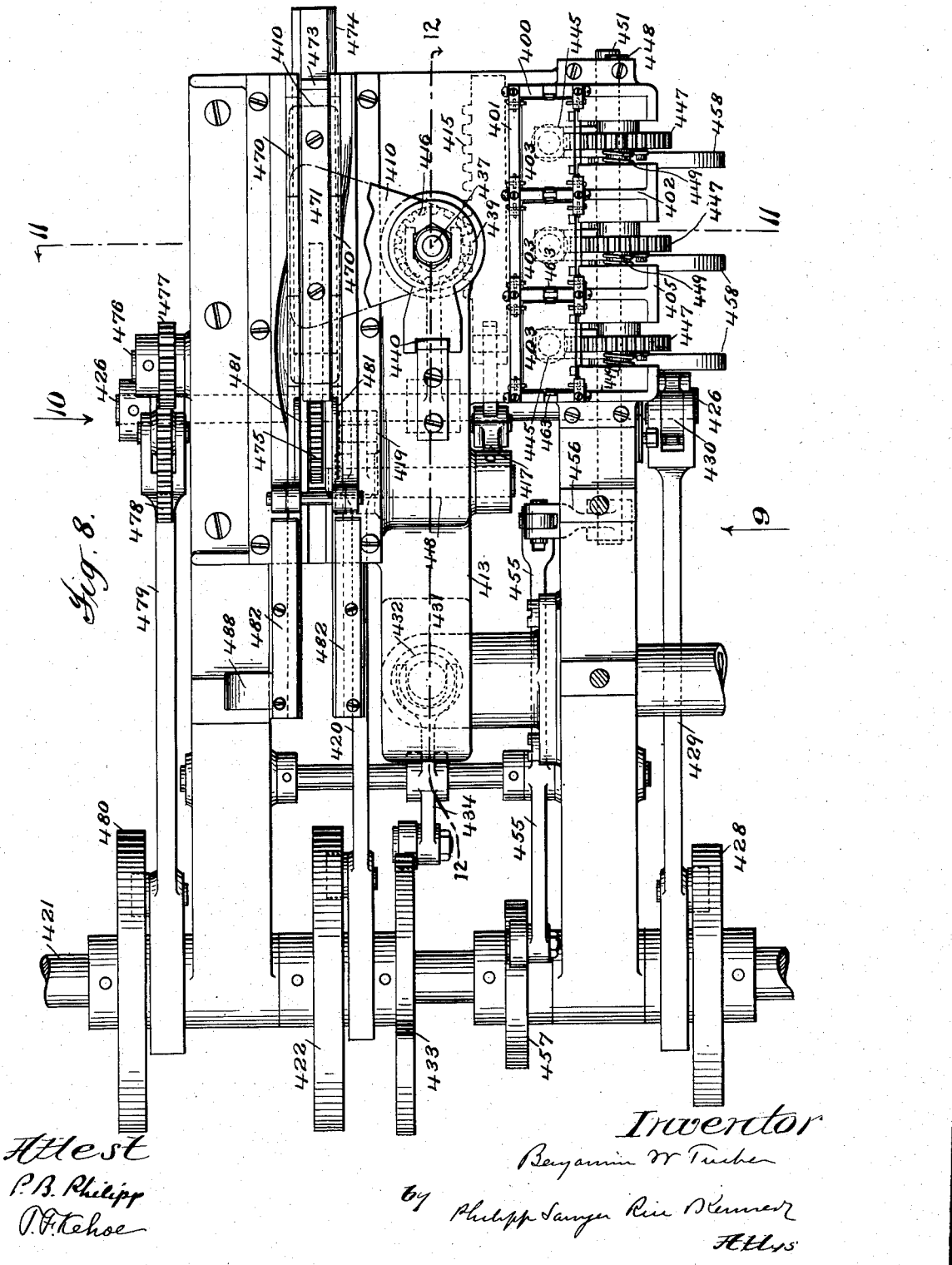

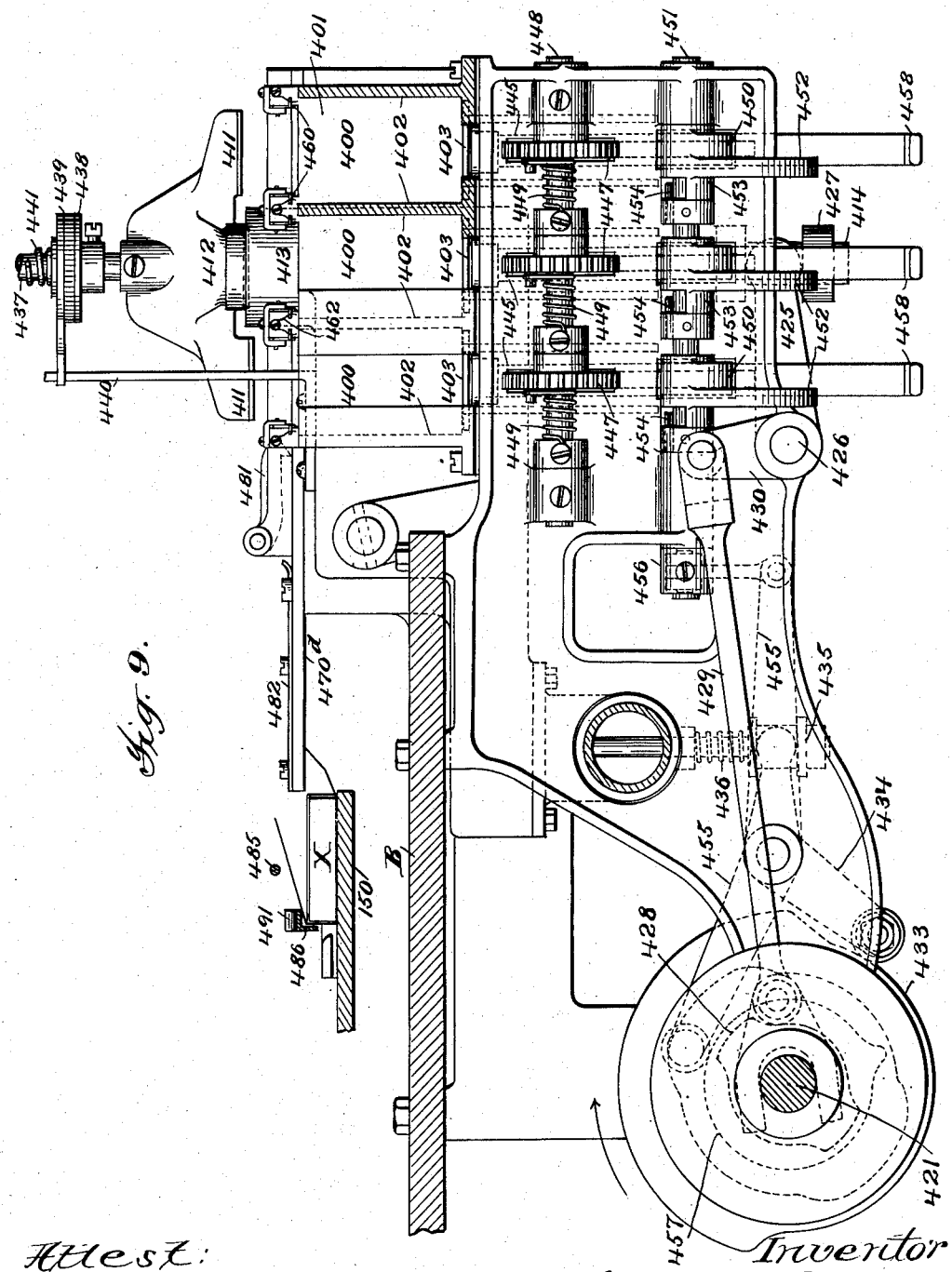

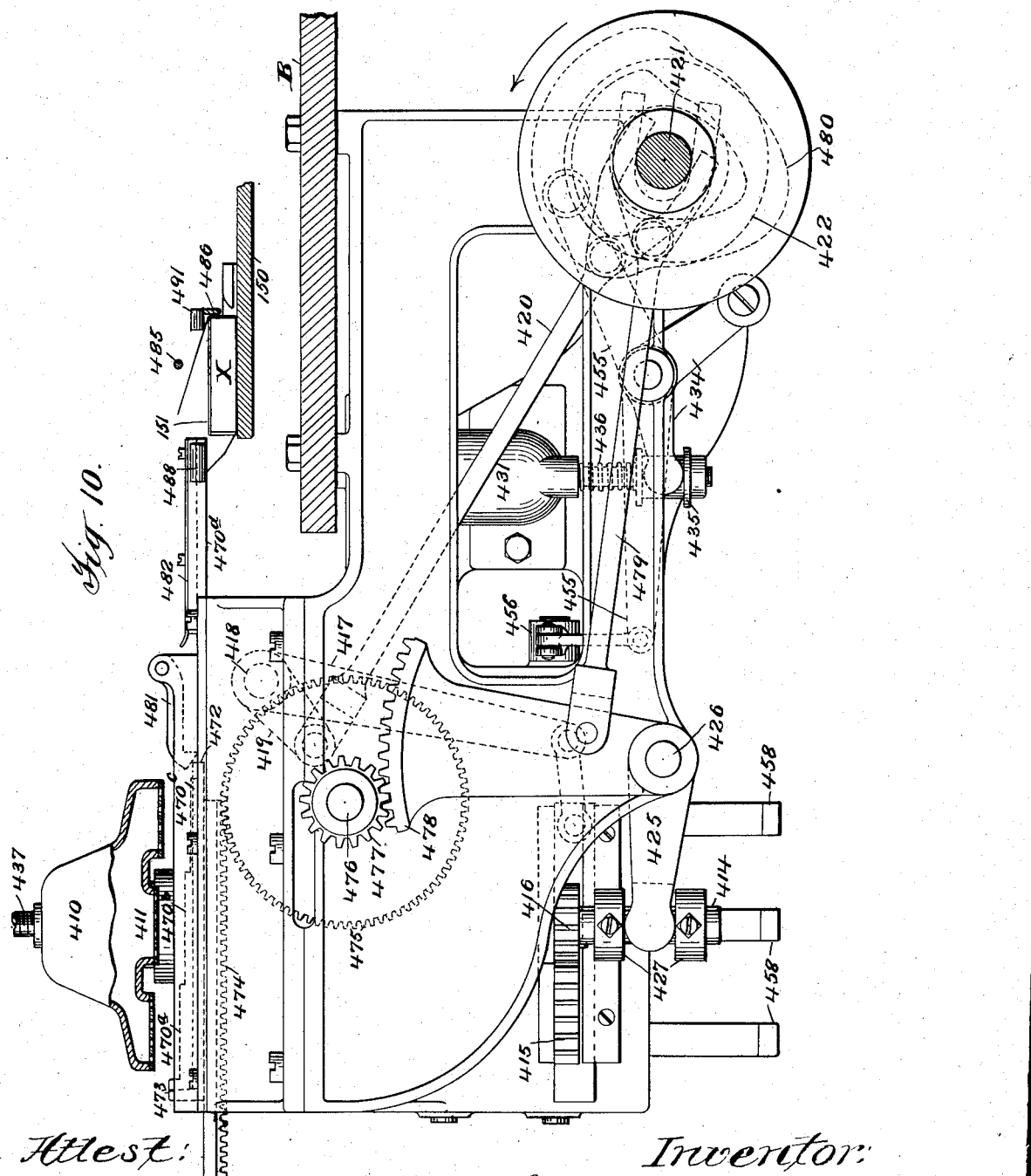

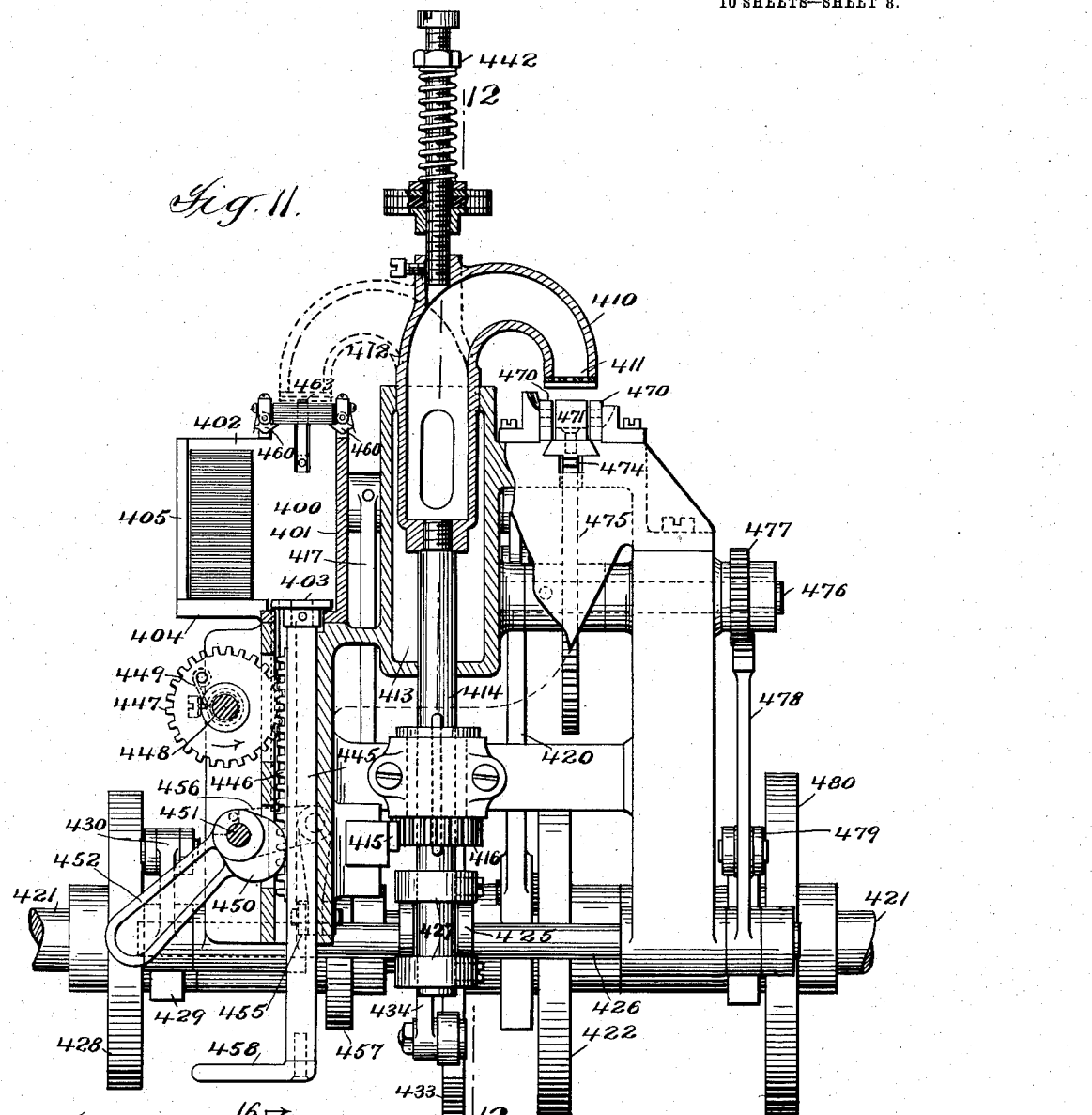

No. 851,263. PATENTED APR. 23, 1907.
B. W. TUCKER.
BOXING MACHINE.
APPLICATION FILED FEB. 8, 1904.
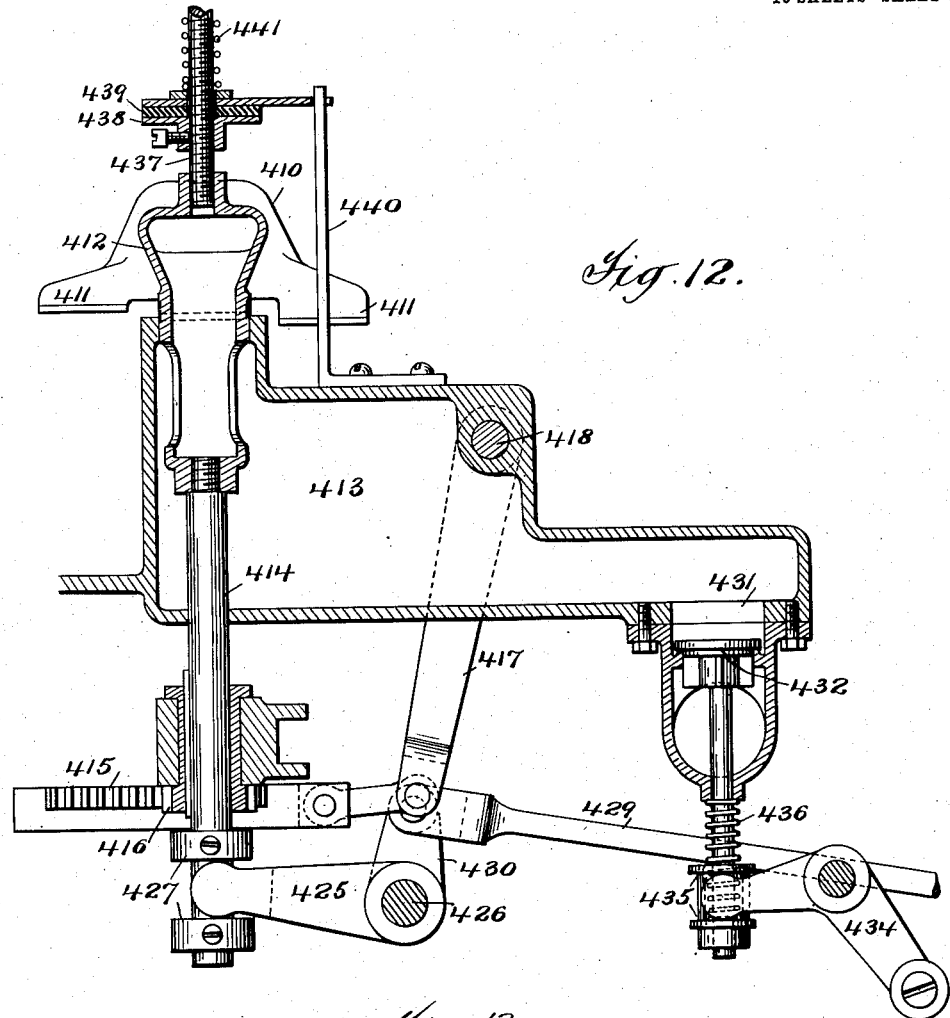
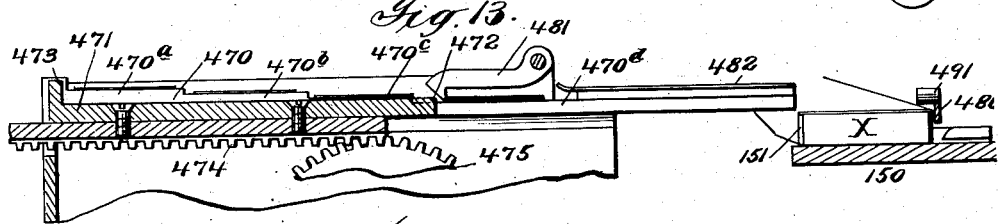
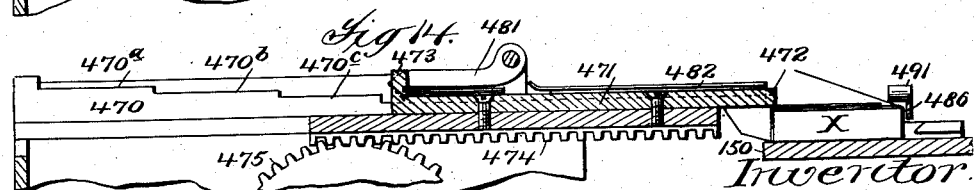

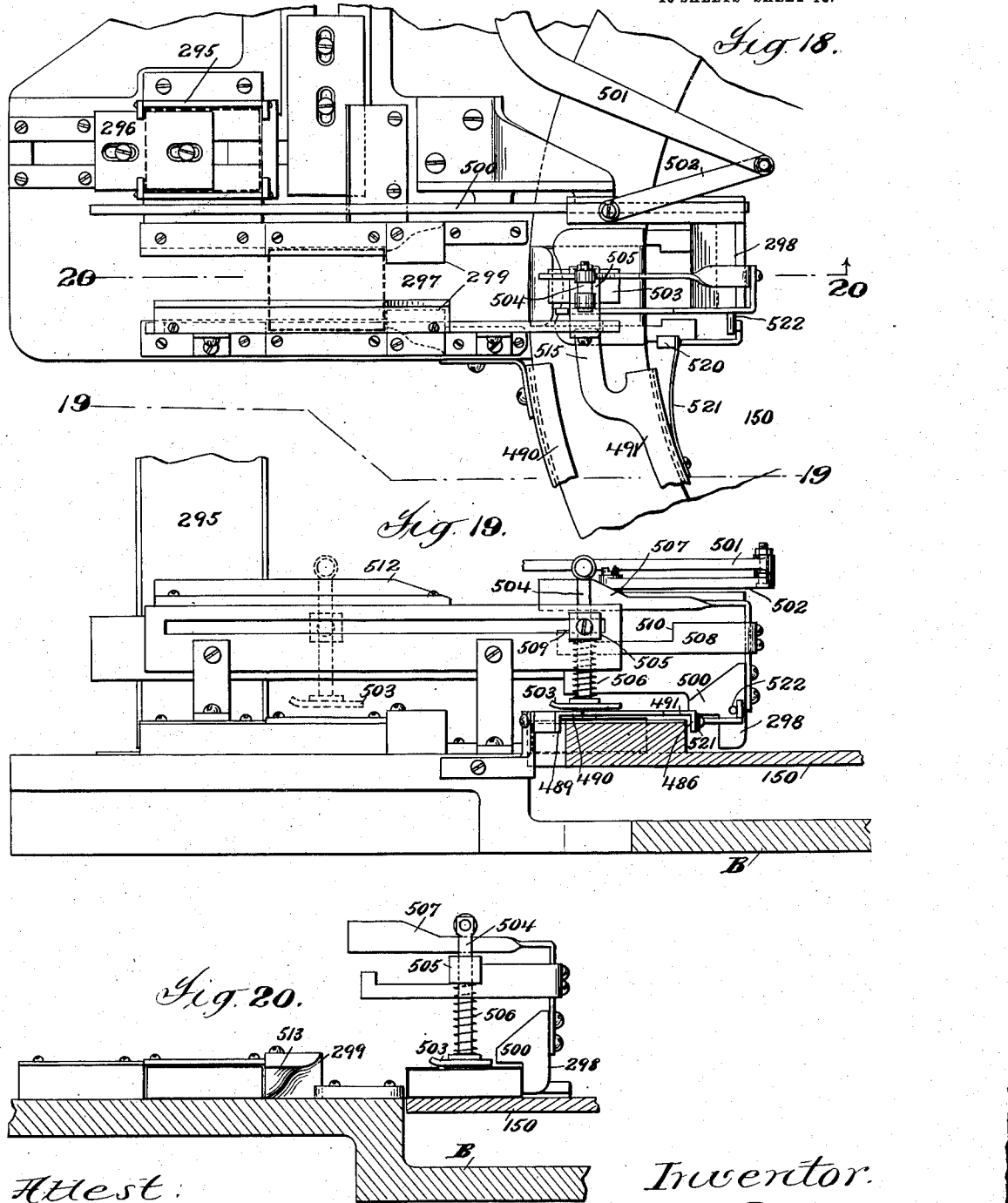

UNITED STATES PATENT OFFICE.

BENJAMIN W. TUCKER, OF NEWARK, NEW JERSEY, ASSIGNOR TO THE AMERICAN TOBACCO COMPANY, OF NEW YORK, N. Y., A CORPORATION OF NEW JERSEY.

BOXING-MACHINE.

No. 851,263. Specification of Letters Patent. Patented April 23, 1907.

Application filed February 8, 1904. Serial No. 192,629.

*To all whom it may concern:*

Be it known that I, BENJAMIN W. TUCKER, a citizen of the United States, residing at Newark, county of Essex, and State of New Jersey, have invented certain new and useful Improvements in Boxing-Machines, fully described and represented in the following specification and the accompanying drawings, forming a part of the same.
This invention relates to packing machines, and more particularly to machines for packing cigarettes or similar articles in boxes.

The invention has been made especially with the idea of improving the packing machine for which an application for Letters Patent of the United States was filed by me on the 30th day of September, 1902, Serial No. 125,419. It will be understood, however, that the features forming the present invention are not limited to use in connection with or as a part of such machine, but may be employed in connection with other machines to which they may be found applicable. By the machine of such application the cigarettes are fed in predetermined quantities by a packing carrier to a wrapping carrier and there associated with wrapper sheets. The sheet is wrapped about the cigarettes and the ends folded to form a package which is then deposited in a partially formed box carried by a boxing carrier, the blank for forming the box having been fed to the boxing carrier and partially folded thereon. A charge of tips or holders is deposited in each partially folded box beside the package of cigarettes and the folding of the box is then completed and the folded box inserted into a sheath or tubular cover and delivered from the machine.

One feature of the present invention relates to improvements in the packing carrier whereby a charge of cigarettes is transferred from a delivery chute or way into a pocket or receptacle presented in position to receive the cigarettes from such a carrier. More particularly, this part of the invention relates to an adjustable gauge or stop for limiting the movement of the cigarettes into the packing carrier, and to means for securing the proper position of the side edges of the wrapper sheet as such sheet is carried with the cigarettes into the cigarette receiving pocket.

Another part of the invention relates to means for feeding cards or coupons into the box or case containing a charge of cigarettes or other articles to be packed, and mechanism for folding the top flap of the box containing the articles so as to retain the coupons in position therein.

Another part of the invention relates to means for maintaining the top flap of the filled box in position as the box is advanced to be inserted in a sheath or cover.

As a full understanding of the invention can best be given by a detailed description of a machine embodying all the features thereof in their preferred form, such a description will now be given in connection with the accompanying drawings, showing the various features of the invention as applied to a machine such as shown and described in my application No. 125,419 above referred to.

In said drawings—Figure 1 is a plan view, partly in section, and with parts omitted, of such a machine. Fig. 2 is an elevation, on an enlarged scale and partly in section, looking in the direction of the arrow 2 in Fig. 1, showing the packing carrier and its operating mechanism. Fig. 3 is a view, on a still larger scale and partly in section, looking in the direction of the arrow 3 of Fig. 2. Fig. 4 is a view similar to Fig. 3, but showing the parts in a different position. Fig. 5 is a section taken on line 5 of Fig. 3. Fig. 6 is a sectional plan view taken on line 6 of Fig. 5. Fig. 7 is a detail plan view of parts below the packing carrier. Fig. 8 is an enlarged plan view of the coupon transferring and inserting mechanism. Fig. 9 is a side view of the coupon transferring and feeding mechanism, partly in section, looking in the direction of the arrow 9 on Fig. 8. Fig. 10 is a side view, partly in section, of said mechanism looking in the direction of the arrow 10 on Fig. 8. Fig. 11 is an end view, partly in section, on line 11 of Fig. 8. Fig. 12 is a detail sectional view taken on line 12 of Fig. 8. Figs. 13 and 14 are detail sectional views of the coupon associating and inserting devices showing the parts in different positions. Figs. 15, 16 and 17 are detail views of parts of the coupon holders. Fig. 18 is an enlarged plan view of the devices for folding down the top flap of the box and for inserting the box into a tubular sheath or cover. Fig. 19 is a side view, partly in section, on line 19 of Fig. 18. Fig. 20 is a section on line 20 of Fig. 18.

Referring to the drawings, the various parts of the machine are supported by a table B, and the machine comprises a packing carrier or depositing plunger 50 by which successive charges of cigarettes are received from a way 12 and deposited in pockets 26 of a horizontal rotary wrapping carrier 25 which is given a step by step rotary movement in time with the movements of the packing carrier and each movement corresponding to the distance between adjacent pockets 26. The pockets 26 are formed with open ends and with side walls of a suitable height for the purpose of holding up the sides of the wrapper and said side walls are formed with vertical cuts or grooves 28 for the purpose of receiving correspondingly formed folders for folding down the upturned sides of the wrappers.

Before a charge of cigarettes is deposited in one of the pockets 26, a wrapper sheet $x$ is fed in position over the pocket so as to be carried down into the pocket with the charge of cigarettes. Such wrapper sheets are preferably of metal foil, and by the machine shown, wrapper sheet lengths of such foil are successively fed from a web by means of intermittently operating feeding rolls 32 and 33 over a support 34 and the successive wrapper lengths are severed from the web by a swinging knife 35. The support 34 is formed of two plates, $34^a$ and $34^b$ separated to leave an opening between their inner edges corresponding in width to the width of the pockets 26 and positioned so that such openings shall be directly above one of the positions of rest of the pockets 26. After a charge of cigarettes has been deposited in one of the pockets 26 with the wrapper $x$ partially folded thereabout, the wrapping carrier 25 is moved forward a step to bring another pocket 26 in position to receive a charge of cigarettes and to carry the preceding charge toward the folding devices whereby the folding of the wrapper about the cigarettes is completed. Such folding devices are or may be as shown and described in my application No. 125,419 above referred to. As they form no part of the present invention, they are not shown in the drawings and need not be further referred to herein. After the folding of the wrapper about the cigarettes has been completed, the package X thus formed is transferred from the wrapping carrier and deposited in a box which is presented by an intermittently rotating boxing carrier 150 provided with a plurality of radially arranged box holders 151, which carrier as in the machine of my said application No. 125,419, and as here shown, is mounted concentrically with the wrapping carrier 25 and connected to move therewith and is of greater diameter than the wrapping carrier so that the holders 151 will lie beyond the edge of the wrapping carrier. For supplying boxes to the holders 151, blanks are fed into position over the holders and formed therein as shown and described in my said application No. 125,419. The blank feeding mechanism shown in Fig. 1 of this application differs from that shown in my application No. 125,419 in that a pneumatic transferring carrier is provided for taking the box blanks successively from a pile and depositing them on the slide or pusher 156 by which they are fed into position over the holders 151. This blank transferring mechanism includes certain features of novelty which, however, are included in the coupon feeding mechanism forming part of the present invention, and need not, therefore, be specifically described or further referred to in connection with this part of the machine. After a box blank has been advanced into position over one of the holders 151 and pressed down into the holder and the box thereby partly formed in the holder, the carrier 150 is moved forward and a package of cigarettes from the corresponding pocket of the wrapping carrier 25 is transferred therefrom and deposited in the partially formed box. The mechanism for transferring the packages from the wrapping carrier to the boxing carrier is or may be of the construction shown and described in my said application No. 125,419. The machine of my said application No. 125,419, is, as before stated, constructed to pack a charge of cigarette holders in each box beside the package of cigarettes. The present machine may be provided with such holder packing mechanism, and such mechanism may be of the construction shown and described in my said application, No. 125,419, and may be arranged to deposit the holders in the partially formed box beside the package of cigarettes when the box holder 151 containing the box is in position A' of Fig. 1, where a partially formed box is shown in the holder 151 with the package of cigarettes and the charge of holders therein. By successive movements of the boxing carrier 150, the box holders containing the partially formed and filled boxes are advanced to the coupon inserting mechanism C and thence to the position where they are fed from the carrier after having their end flaps folded down. If the boxes are to be inserted in sheaths or covers, the sheaths are or may be supplied by sheath supplying mechanism D, such as shown in my said application No. 125,419.

Referring to the packing-carrier or depositing plunger 50, the cigarettes are received by the depositing plunger from an inclined way having a curved delivery end 13, as in my said application No. 125,419. The machine shown is constructed to pack the cigarettes in the boxes in two layers of five cigarettes each, and the depositing plunger is preferably formed to receive the two layers of cigarettes forming a charge and then to descend to deposit the two layers of cigarettes at once in one of the pockets 26 of the wrapping carrier 25. As shown, the depositing plunger comprises a head 51 carried by a hollow plunger stem 52 mounted to reciprocate vertically in a guide 53 and having downward extensions 54 which form the ends of the cigarette receiving chamber. The head 51 carries horizontally moving slides 55 which carry downwardly extending plates having their lower ends turned inward to form supports 56 and 57. The slides 55 are normally drawn inward toward each other by means of springs 58, and when in their normal inward position as shown in Fig. 5, the supports 56 and 57, extend inward beyond the inner face of the ends 54 in position to extend beneath the ends of the cigarettes when the latter are fed between the ends 54. The plunger head also preferably carries a presser plate 60 mounted on spring rods 61 normally held by the springs in its upper position as shown in Fig. 5. For the purpose of moving the slides 55 for withdrawing the supports 56 and 57, and for operating the presser plate 60, a second plunger stem 62 is mounted to reciprocate vertically within the plunger stem 52. This plunger stem 62 carries a plunger head 63 having its lower end formed wedge shaped to engage the slides 55 and thereby force them outward as the plunger head 63 moves downward relatively to the plunger head 51.

In the operation of the machine, after the depositing plunger has deposited a charge of cigarettes, it is moved upward opposite the delivery end of the way 12 with the supports 56 in position to receive a layer of cigarettes therefrom. The cigarettes will then be fed by gravity down the way until five have been received on the supports 56. The depositing plunger next moves upward far enough to bring the space above the supports 57 opposite the delivery opening of the way 12 to receive the second layer of five cigarettes. After the two layers have been received by the plunger, the plunger is moved downward to carry the cigarettes into the pocket 26 which is then beneath the plunger, the two stems 52 and 62 at first moving together so as to maintain the supports 56 and 57 in their inner position. As the plunger head reaches its lowermost position, the stem 62 is given a further movement to cause the head 63 to force the slides 55 apart and withdraw the supports from beneath the ends of the cigarettes and also to engage the presser plate 60 and force it slightly downward to insure the delivery of the cigarettes and their even packing. The plunger stem 52 then begins to rise, the stem 62 remaining at first in its lowermost position to hold the supports retracted and to retain the presser plate in its pressing position for the purpose of giving a set to the cigarettes. Then the stem 62 also begins to rise and the depositing plunger is brought back into position to receive the first layer of another charge of cigarettes. The plunger stems 52 and 62 may be reciprocated by any suitable means. They are shown as reciprocated by suitable connections as shown in my said application No. 125,419 from a double faced cam disk 70 on the shaft 20. As thus far described the depositing plunger is the same as shown in my said application No. 125,419.

For limiting the movement of the cigarettes into the depositing plunger, there is preferably provided an adjustable gauge or stop plate 350, which plate is preferably extended vertically to act as a retaining plate for the cigarettes as the plunger is reciprocated. This plate 350 is shown as carried by screws 351 having heads socketed in said plate and said screws being threaded into an arm 352 extending downward from the guide 53. The stop plate may thus be adjusted to stop the movement of the cigarettes into the plunger when in just the right position to prevent injury to the end cigarette in the plunger or the end cigarette in the way 12 as the plunger moves past the end of the way.

A wrapper sheet having been positioned on the support 34, as the plunger descends with a charge of cigarettes the wrapper sheet will be carried downward with its central portion beneath the cigarettes and its sides bent upward about the cigarettes and plunger, as indicated in Fig. 4. To maintain the upper portion of the sides of the wrapper in proper position as shown in said figure, and to prevent their becoming wrinkled against the sides of the plunger head and torn as the latter is raised, wrapper engaging fingers are provided, preferably a pair of such fingers 360 and 361, at each end of the plunger head, which as the plunger head moves downward and carries the charge of cigarettes downward with the wrapper folded about the same, are moved into position to engage the sides of the wrapper and hold the same with light pressure against suitably arranged guides, the fingers preferably then remaining in operative position during the first part of the upward movement of the plunger head. Each pair of these wrapper engaging fingers is preferably carried by a slide 364 to which the fingers are pivoted, as at 365, and the fingers are preferably provided with upwardly extending arms 366 and 367, which arms are normally engaged by a cam stud 368 on an upward extension of the plunger head for holding said arms apart and the fingers 360 and 361 in their retracted or non-operative position, the arms being held against the cam stud 368 and under tension to move toward each other, as by a spring 369. The slides 364 are normally held in the position shown in Figs. 3 and 5 by means of spring rods 370 and each slide carries an upwardly extending rod 371 which passes through an opening in an arm 372 extending from the guide 53 and carries above the arm 372 an adjustable stop nut 373. By this construction, as the plunger moves downward to deposit the charge of cigarettes, the wrapper holding fingers 360, 361, will move downward with the plunger until they reach the position shown in Fig. 4 when the stop nuts 373 will engage the arms 372 and further downward movement of the slides 364 with the plunger will be prevented. The downward movement of the plunger then continuing, the cam blocks 368 will be moved downward from between the arms 366, 367 of each pair of wrapper engaging fingers and the arms will be drawn together by the springs 369 and the wrapper engaging fingers thereby moved outward to their operative position as shown in Fig. 4. The fingers will then remain in this position during the further downward movement of the plunger and during its return movement until the cam blocks 368 again engage and force apart the arms 366 and 367 of each pair of fingers, thereby retracting the fingers from engagement with the sides of the wrapper.

For cooperating with the wrapper engaging fingers, guides are preferably provided on each side of the path of the plunger. On the side from which the pocket 26 is moved after having received its charge, a guiding flange 375 is provided extending downward from the wrapper supporting plate 34$^b$. On the opposite side of the path of the plunger, or the side toward which the pocket is moved after having received its charge, two short guide blocks or fingers 376 and 377 are provided. To prevent injury to or displacement of the upstanding side of the wrapper as the carrier 25 is moved to advance the pocket 26 with its charge from its receiving position, the guide finger 376 is arranged so as to be moved out of the path of the edge of the wrapper to allow the same to pass. For this purpose, it is preferably carried by a vertical shaft 379 and held normally in operative position as by a spring 380. The lower end of the shaft carries an arm 381 projecting into the path of shoulders 383 on the carrier 25, there being a shoulder 383 for each pocket 26 and said shoulders being in position to engage the arm 381 and thereby turn the shaft to swing the guide 376 out of the path of the up-standing edges of the wrapper as the carrier commences each movement. The guide 377 is not shown as mounted so as to be moved to permit the free passage of the up-standing edges of the wrapper as it is found that it is not essential that this arm be so mounted. It is shown as formed by a downward extension from the wrapper supporting plate 34$^a$.

Referring now to Figs. 1 and 8 to 17, the coupon feeding and inserting mechanism, as shown in said figures, comprises a plurality of coupon holders and means for maintianing the piles of coupons in said holders in position to have the top coupons taken successively therefrom, a transferring device for transferring coupons from said holders, means for associating coupons thus transferred, and means for inserting the associated coupons into the box with the cigarettes. The mechanism shown is adapted for inserting in each box as it is presented in position by the boxing carrier 150 a charge of three coupons, one taken from each of three piles. It will be understood that the term "coupon" is used for convenience and that this part of the invention may be employed for inserting other sheets or cards in packages of cigarettes or other articles, or for associating and feeding sheets or cards for other purposes.

The holders 400 are arranged side by side in a row and each holder comprises a guideway or main holding compartment having back walls 401 and side walls 402 in which the piles of coupons are supported and fed upward as required by a vertically moving support 403. For each holder there is also provided a supply compartment having a stationary bottom 404, side walls 402 and front walls 405. The bottom and front walls of such supply compartments are cut away centrally as shown in Figs. 8 and 9, to enable the pile of coupons to be placed in the compartments in the position shown in Fig. 11 and to be pushed from each compartment inwardly onto the support 403 when the latter is in the position shown in Fig. 11.

The coupons are transferred from the holders by a suction transferrer 410. This transferrer is preferably constructed as shown in the drawings, being formed by a suction head 411 carried by a neck 412 extending downward into a suction box 413 and supported by a vertical shaft 414 mounted in suitable bearings and rocked intermittently to oscillate the suction head by means of a reciprocating rack 415 engaging a pinion 416 splined on the shaft. The rack 415 is reciprocated by means of a lever 417 carried by a rock shaft 418 which is provided at its other end with a short arm 419 to which is pivoted a connecting rod 420 having a forked end embracing the cam shaft 421 and carrying a cam roll running in the groove of a cam 422 on said cam shaft. By such connections the shaft 414 is rocked to oscillate the transferrer head 411 between its coupon seizing position, as shown in dotted lines in Fig. 11, to its delivery position, shown in full lines in Fig. 11 and in Fig. 1. The shaft 414 is also given a vertical reciprocation to move the suction head down into position to engage the coupons in the holder, and to raise it from such position as it makes its transferring movement. Such reciprocation is given to the shaft 414 by means of a forked lever 425 carried by a shaft 426 and having its forked end in engagement with collars 427 on the shaft 414. The shaft 426 is rocked by means of a cam 428 on the cam shaft 421 acting through a forked connecting rod 429 pivoted to an arm 430 on the shaft 426.

The suction box 413 is connected with a suitable exhausting apparatus through an exhaust passage 431 which is controlled by a valve 432 operated by a cam 433 on the cam shaft 421 acting through a lever 434, one arm of which carries a cam roll running in engagement with the cam and the other arm of which is forked to engage a collar 435 on the stem of the valve 432, the cam acting to open the valve against the tension of a spring 436, which in turn acts to close the valve when permitted by the cam. The cam 433 is timed so as to open the valve 432 as the suction head 411 comes into engaging position shown in dotted lines in Fig. 11, and to close the valve as the suction head comes into delivery position shown in full lines in Fig. 11.

For securing accuracy in the movement of the suction head to its engaging and delivery positions, the suction transferrer is provided, as shown in Figs. 1, 8 9, 11, 12, with an upwardly extending rod 437 arranged in line with the shaft 414 and provided with a disk 438 engaged by a friction disk 439 loosely mounted on said shaft and held against turning by means of an arm in engagement with a rod 440, said friction disk being held in engagement with disk 438 by means of a spring 441, the tension of which is adjustable by turning the nut 442 on the rod 437.

The supports 403 are each carried by a vertically sliding rod 445 which carries a rack 446 with which engages a pinion 447 mounted free to rotate on a shaft 448. Each pinion 447 is under tension, as by a spring 449, to rotate in the direction of the arrow in Fig. 11 to force the rod 445 and its support 403 upward, and each rod is normally held against such upward movement by an eccentric grip 450 loosely mounted on a rock shaft 451 and provided with a handle 452 whereby the eccentric may be moved to release the rod 445 and permit it to be moved upward when desired. Each eccentric also carries a sleeve 453 partially cut away, as shown in Fig. 9 and in dotted lines in Fig. 11, to receive a pin 454 carried by a sleeve fast on the shaft 451 adjacent to the sleeve 453 of the eccentric. The shaft 451 is rocked intermittently by means of a lever 455, one arm of which is connected by a link to an arm 456 on the shaft 451 and the other arm of which carries a cam roll which is engaged by a cam 457 on cam shaft 421. Each of the rods 445 is provided with a treadle 458 for drawing the rod and support downward when it is desired to replenish the pile of coupons on the support.

When a supply of coupons has been placed on one of the supports 403, the handle of the eccentric 450 is raised to release the rod 445 and permit it to rise until the top of the pile of coupons is brought into engagement with the under face of the suction head 411 when the latter is in the position shown in dotted lines in Fig. 11. The eccentric is then allowed to grip the rod 445 again to prevent its further upward movement during the time that the suction head is making its transferring and return movements. As the suction head again comes into engaging position, the shaft 451 is rocked to move the eccentrics out of engagement with the rods 445, thereby permitting each of the rods to move upward independently of the others sufficiently to bring the top of its pile of coupons into engagement with the under face of the suction head 411. The shaft 451 then quickly returns to its normal position and the eccentrics 450 again grip the rods 445 to hold the rods and supports against upward movement during the next transferring and returning movements of the suction head. The top of each pile of coupons will thus be always in position to have the top coupon engaged by the suction head, the upward movements of the supports being always just sufficient to raise the pile the required amount whatever may be the thickness of the coupons in the pile.

To provide for replenishing the pile of coupons in the holders without interrupting the operation of the machine, each holder is preferably provided with swinging supports 460, formed with cam faces 461 so that they will be forced outward as the pile of blanks rises, and under tension to move inward, as by the springs 462, so that if the support 403 is lowered these auxiliary supports 460 will move inward beneath the blanks which are above them and support such blanks, as shown in Fig. 11, while a new supply of blanks is being placed in position on the support 403. The support 403 is then allowed to rise again. With the construction shown, in which each holder is provided with a supply compartment, a fresh supply of coupons may be placed on the supports 403 very quickly since the coupons may be piled in the supply compartment, as shown in Fig. 11, and from there quickly pushed inward onto the support 403 when the latter is depressed. The coupon holders are also preferably provided at each end with spring fingers 463 for engaging the edges of the top sheets of the pile to prevent the withdrawal of more than one sheet at a time from the pile by the suction head.

The coupons are deposited by the suction transferrer onto a stepped support or way 470. Such stepped support or way is formed with a number of receiving surfaces 470$^a$, 470$^b$, and 470$^c$, corresponding in number to the number of coupons to be deposited on the support and each of said receiving faces beyond the first one being at a lower level than the preceding one, and beyond the receiving surface 470$^c$ there is a feed way 470$^d$ at a lower level than the receiving surface 470$^c$. The feedway 470$^d$ extends radially of the boxing carrier 150 and with its inner end in position to have the coupons projected therefrom into the box or package when one of the box holders 151 is in the position A$^2$, as indicated in Fig. 1. The support 470 is formed with a longitudinally extending slot or opening to receive a feed slide 471 mounted to reciprocate longitudinally of said support and provided with a feeding shoulder 472 at its inner end and an upwardly extending feeding shoulder 473 at its outer end, said feeding shoulders being spaced apart a distance slightly greater than the combined length of the receiving surfaces 470$^a$, 470$^b$ and 470$^c$. The slide 471 carries a rack 474 with which engages a gear wheel 475, carried by a shaft 476 which also carries a pinion 477 which is engaged by a segment gear 478 loosely mounted on the shaft 426 and rocked by means of a pitman 479 having a forked end embracing the shaft 421 and carrying a cam roll running in the groove of a cam 480 on the shaft 421. The cam 480 is timed to give the slide 471 a forward and return reciprocation after each delivery movement of the suction transferrer.

The coupons having been deposited on the receiving surfaces 470$^a$, 470$^b$ and 470$^c$, as the feed slide moves forward its shoulder 473 will first engage the coupon on the receiving surface 470$^a$ and move it edgewise from such surface and onto the coupon on the receiving surface 470$^b$. Then the two associated coupons on the receiving surface 470$^b$ will be moved edgewise from such surface and on to the coupon on the receiving surface 470$^c$, and the three associated coupons will then be fed edgewise from the feed surface 470$^c$ and beneath the retaining fingers 481 while resting on the feed slide. During the return movement of the feed slide, the coupons which have been fed forward are held against backward movement with the slide by the retaining fingers 481, and as the slide reaches the end of its outward movement such coupons drop onto the feed way 470$^d$, as shown in Fig. 13. The feed slide then remains stationary while the suction transferrer deposits another set of coupons upon the receiving surfaces 470$^a$, 470$^b$, and 470$^c$. On the next inward movement of the feed slide, the coupons from the receiving faces will be associated as before, and the coupons fed beneath the retaining fingers 481 by the previous movement of the slide will be pushed by the shoulder 472 of the slide along the feed way 470$^d$ and projected from said feed way into the box in the boxholder 151, as indicated in Fig. 14. The feed way 470$^d$ is preferably provided with side guide flanges 482 as shown.

The suction head 411 is preferably formed with a plurality of suction faces corresponding to the number of coupon holders, and such faces are preferably arranged in different levels corresponding to the levels of the receiving faces 470$^a$, 470$^b$, 470$^c$.

Before the coupons are inserted in the box, it is desirable that the inner end of the box be turned up and the top flap extending from such inner end be folded partially down over the contents of the box. For this purpose, folding guides 485 and 486 are provided to engage the end and top flap of the box as the latter approaches the coupon receiving position A$^2$ in Fig. 1. These guides are formed to fold the end of the box up against the contents and fold the top flap over about in the position shown in Figs. 10, 13 and 14. If the outer end flap of the box were left unfolded while the inner end and top flap were being folded, the contents of the box would be liable to become slightly displaced. To avoid this, there is provided a folding guide 487 in position to fold the outer end flap of the box upward and hold it in position against the end of the box while the inner end and top flap are being folded by the guides 485 and 486. In order that the upstanding outer end flap shall not interfere with the feeding of the coupons into the box, the guide 487 extends only a short distance so as to permit the end flap to spring outward again, and to insure its passing properly beneath the end of the feed way 470$^d$ a guide 488 is provided to engage the flap as the box comes into position opposite the end of the feed way. As the carrier moves forward again after the coupons have been fed into the box, the outer end flap of the box is again turned upward by a guide 489 which is also provided with an inwardly extending flange 490 by which the end flap is turned down over the top of the box. The guide 486 is also provided beyond the coupon receiving position with an inwardly extending flange 491 for further turning down the top flap of the box and holding it in position during the further movement of the carrier. The guides 486 and 489 and their flanges 491 and 490 extend preferably to the point at which the boxes are fed from the boxing carrier 150. The end flaps of the box are thus held in their folded position during the further movement of the carrier and the coupons are thereby prevented from becoming displaced as the box moves from the coupon receiving position to the delivery position.

In the position A$^3$ the boxes are fed from the boxing carrier by means of a reciprocating slide or pusher 298. If the boxes are to be inserted in sheaths or covers, the sheaths may be supplied by any suitable mechanism from a suitable source, as from a magazine 295 by means of a pusher 296, and may be positioned by any suitable mechanism to receive the filled boxes; for example as in U. S. Patent 482,542, dated September 13th, 1892. The boxes are advanced by the pusher 298 through a raceway 297 and the boxes thereby inserted into the sheaths which have been positioned in the raceway. The pusher 298 is mounted to slide on a guide bar 500 and is reciprocated by means of a lever 501 connected to the slide by a link 502. The slide normally lies in the position shown in Figs. 18 and 19, and must, therefore, make a part of its forward movement before engaging the box in the holder 151.

For holding the top flap of the box in position as the box is moved forward through the way 297, a presser foot 503 is provided carried by a rod 504 mounted to slide vertically in a slide or carriage 505. The rod 504 and the presser foot 503 are under tension to move downward, as by means of spring 506, but are held in their upper position, as shown in Fig. 19, by means of a cam plate 507 when the pusher 298 is in its retracted position, as shown in said figure. The cam plate 507 is mounted to move with the pusher 298, and there is also mounted to move with said pusher a plate 508 provided with oppositely facing shoulders 509 and 510. These shoulders are so spaced and positioned that on the inward or return movement of the slide 298 the shoulder 509 will engage slide 505 and the shoe 503 will thereby be moved into position over the delivery position of the holders 151, as shown in Fig. 19, and that on the outward or delivery movement of the slide 298 when the slide has moved outward far enough to engage the inner end of the box in the holder 151, the shoulder 510 will engage the slide 505 and move the slide 505 and the presser foot with the slide 298 during its further outward movement.

The cam plate 507 is so formed that as the slide 298 moves outward, the presser foot is permitted to move downward to bear against the top flaps of the box, as shown in Fig. 20, before the slide 298 comes into engagement with the inner end of the box. The presser foot then remains in this holding position and moves outward with the box to hold the top flaps of the box in position as the box is advanced through the way 297. As the box approaches the end of its movement, the presser foot is raised by means of a cam plate 512, as shown by dotted lines in Fig. 19.

When the box is provided with side-wings extending from the top flap and adapted to be turned down outside of and to over-lap the sides of the box which are turned up from the bottom, turner guides 299 are preferably provided for turning down said side-wings as the box is advanced through the raceway 297. These guides 299 are also preferably provided with top flanges 513, which serve to hold the top flaps of box down as the box is inserted into the sheath, the position of which sheath is indicated by heavy dotted lines in Fig. 18. The cam 512 is preferably positioned so as to raise the presser foot after the box has been advanced into position to have the top flaps held down by the flanges 513. The guides 486 and 489 preferably terminate as shown in Fig. 18, and a finger 515 is provided extending from the flange 491 of the guide 486 to insure the top flap of the box entering beneath the presser foot 503.

Friction with the guide 486 and its flange 491 and the finger 515, tends to move the top flap of the box slightly out of position laterally as the box is moved to delivery position by the movement of the carrier 150. To correct such displacement of the top flap, there is provided a tapping device formed by a lug 520 carried by spring 521 and held in its retracted position shown in Fig. 18, when the pusher 298 is in its inner position, by means of a pin 522 on the pusher engaging a finger extending from the lug 520. As the pusher 298 begins its outward or delivery movement, the lug 520 is released and is then moved inward by the spring 521 to engage the edge of the top flap of the box and thereby correct any displacement of such top flap.

It will be understood that various changes and modifications may be made in the construction and arrangement of parts as shown and to which the foregoing description has been mainly confined, and that the invention is not to be limited to the exact construction and arrangement shown, but includes various changes and modifications thereof within the claims. It will be understood also that parts of the machine shown may be used independently of other parts or in connection with other machines.

What I claim is:—

1. The combination with a depositing plunger, of a receiving device to which cigarettes or similar articles are delivered by the plunger, supports located on either side of the path of movement of the plunger for supporting a wrapper sheet between the plunger and the receiving device and adapted to turn the sides of the wrapper sheet upward about the articles as the plunger makes its delivery movement, and means operative for supporting the upstanding sides of the wrapper sheet below said supports during the latter part of the depositing movement and the first part of the return movement of the plunger to prevent their being injured or displaced by the movement of the plunger, substantially as described.

2. The combination with a depositing plunger, of a receiving device to which cigarettes or similar articles are delivered by the plunger, supports located on either side of the path of movement of the plunger for supporting a wrapper sheet between the plunger and the receiving device and adapted to turn the sides of the wrapper sheet upward about the articles as the plunger makes its delivery movement, and means for supporting the upstanding sides of the wrapper sheet by engagement with the inner surfaces of said upstanding sides below said supports during the latter part of the depositing movement and the first part of the return movement of the plunger to prevent their being injured or displaced by the movement of the plunger, substantially as described.

3. The combination with a depositing plunger, of a receiving device to which cigarettes or similar articles are delivered by the plunger, supports located on either side of the path of movement of the plunger for supporting a wrapper sheet between the plunger and the receiving device and adapted to turn the sides of the wrapper sheet upward about the articles as the plunger makes its delivery movement, and supporting means for engaging the inner surfaces of the upstanding sides of the wrapper sheet below said supports while the plunger is moving between the upstanding sides of the wrapper sheet, substantially as described.

4. The combination with a depositing plunger, of a receiving device to which cigarettes or similar articles are delivered by the plunger, supports located on either side of the path of movement of the plunger for supporting a wrapper sheet between the plunger and the receiving device and adapted to turn the sides of the wrapper sheet upward about the articles as the plunger makes its delivery movement, and supporting means for engaging the inner surfaces of the upstanding sides of the wrapper sheet beyond the ends of the plunger and below said supports while the plunger is moving between the upstanding sides of the wrapper sheet, substantially as described.

5. The combination with a depositing plunger, of a carrier having pockets to which cigarettes or similar articles are delivered by the plunger, feeding devices for feeding wrapper sheets between the plunger and pocket in position to be carried into the pockets and partially folded about the articles, supports located on either side of the path of movement of the plunger for supporting the wrapper sheet and adapted to turn the sides of the wrapper sheet upward about the articles as the plunger makes its delivery movement, and supporting means for engaging the inner surfaces of the upstanding sides of the wrapper sheet below said supports while the plunger is moving between the upstanding sides of the wrapper sheet, substantially as described.

6. The combination with a depositing plunger, of a receiving device to which cigarettes or similar articles are delivered by the plunger, means for feeding wrapper sheets between the plunger and the receiving device in position to be carried to the receiving device and partially folded about the articles, wrapper engaging members for engaging the inner surfaces of the upturned sides of the wrapper, and means for moving said members with the plunger during the first part of the depositing movement and the latter part of the return movement of the plunger and for maintaining said members stationary during the latter part of the depositing movement and the first part of the return movement of the plunger, substantially as described.

7. The combination with a depositing plunger, of a receiving device to which cigarettes or similar articles are delivered by the plunger, means for feeding wrapper sheets between the plunger and the receiving device in position to be carried to the receiving device and partially folded about the articles, a pair of wrapper engaging fingers for engaging the inner surfaces of the up-turned sides of the wrapper beyond the end of the plunger, means for moving said fingers into engaging position when the plunger has made a part of its delivery movement and for retracting said fingers when the plunger has made a part of its return movement, substantially as described.

8. The combination with a depositing plunger, of a receiving device to which cigarettes or similar articles are delivered by the plunger, means for feeding wrapper sheets between the plunger and the receiving device in position to be carried to the receiving device and partially folded about the articles, a pair of pivoted fingers mounted beyond the end of the plunger, means for holding said fingers normally retracted laterally toward each other, means for moving said fingers with the plunger during the first part of the depositing movement and the latter part of the return movement, and means for moving said fingers laterally outward to engage the inner surfaces of the up-turned sides of the wrapper during the latter part of the depositing movement and the first part of the return movement of the plunger, substantially as described.

9. The combination with a depositing plunger, of a receiving device to which cigarettes or similar articles are delivered by the plunger, means for feeding wrapper sheets between the plunger and the receiving device in position to be carried to the receiving device and partially folded about the articles, a member mounted to slide on the plunger longitudinally of the direction of movement of the plunger, a pair of wrapper engaging fingers pivoted to said slide, means for holding said fingers normally retracted laterally toward each other, means for controlling the movement of said slide whereby it is caused to move with the plunger only during the first part of the depositing movement and the latter part of the return movement of the plunger, and means for moving said fingers laterally outward to engage the inner surfaces of the up-turned sides of the wrapper during the latter part of the depositing movement and the first part of the return movement of the plunger, substantially as described.

10. The combination with a depositing plunger, of a receiving device to which cigarettes or similar articles are delivered by the plunger, means for feeding wrapper sheets between the plunger and the receiving device in position to be carried to the receiving device and partially folded about the articles, a slide 364 mounted on each end of the plunger, a pair of wrapper engaging fingers 360 and 361 mounted on each of said slides, means for controlling the movement of the slides whereby the slides are caused to move with the plunger only during the first part of the depositing movement and the latter part of the return movement of the plunger, means for holding said fingers normally retracted laterally toward each other, and means for moving said fingers laterally outward to engage the inner surfaces of the up-turned sides of the wrapper during the latter part of the depositing movement and the first part of the return movement of the plunger, substantially as described.

11. The combination with the depositing plunger 50 of the slides 364 mounted on said plunger springs 370 for holding said slides in normal position on the plunger, stops for holding said slides against movement with the plunger after the plunger has made a part of its delivery movement, a pair of wrapper engaging fingers mounted on each of the slides 364, cams 368 for holding said fingers normally retracted laterally, and means for moving said fingers laterally outward when released from said cams, substantially as described.

12. The combination of a holder for filled boxes, means for partially closing one of the sides of the boxes, means for feeding a sheet into the partially closed side of each box, and means for completing the closing of the boxes, substantially as described.

13. The combination of a holder for filled boxes, means for partially closing one of the sides of the boxes, means for feeding a sheet into the partially closed side of each box, means for completing the closing of the boxes, and means for inserting the boxes into tubular covers, substantially as described.

14. The combination of a holder for filled boxes, means for partially closing one of the sides of the boxes, means for feeding a plurality of sheets in the partially closed side of each box, and means for completing the closing of the boxes, substantially as described.

15. The combination of a box carrier for advancing filled boxes, means for partially closing one of the sides of the boxes, means for inserting a sheet into the partially closed side of each box, means for completing the closing of the boxes, and means for delivering the boxes from the carrier, substantially as described.

16. The combination of an intermittently moving carrier provided with a plurality of box holders, mechanism co-operating with said holders to fold and deliver boxes thereto, sheet feeding mechanism for feeding sheets into the filled boxes and to which the filled boxes are successively presented by the carrier, and a covering and delivering mechanism to which the boxes are advanced from the sheet feeding mechanism and by which they are delivered from the carrier and inserted into tubular covers, substantially as described.

17. The combination of an intermittently rotating carrier provided with a plurality of article receiving pockets, wrapping mechanism for folding wrapper sheets about the articles in the pockets, a second intermittently rotating carrier provided with a plurality of holders for boxes for receiving the packages from the first said carrier, sheet feeding mechanism for feeding sheets into the filled boxes, and means for closing the boxes after the sheets have been fed therein, substantially as described.

18. The combination of an intermittently moving carrier provided with a plurality of box holders, wrapping mechanism for folding wrapper sheets about predetermined quantities of articles, a depositing mechanism to which the boxes are advanced by the carrier and by which the packages are deposited in the boxes, sheet feeding mechanism to which the boxes are advanced by the carrier and by which sheets are inserted in the boxes, and means for closing the boxes after the sheets are inserted therein, substantially as described.

19. The combination of an intermittently moving carrier provided with a plurality of box holders, wrapping mechanism for folding wrapper sheets about predetermined quantities of articles, a depositing mechanism to which the boxes are advanced by the carrier and by which the packages are deposited in the boxes, means for partially closing the boxes after the packages are deposited therein, sheet feeding mechanism to which the partially closed boxes are advanced by the carrier and by which sheets are inserted in the boxes, and means for closing the boxes after the sheets are inserted therein, substantially as described.

20. The combination of a carrier for advancing boxes with articles therein, means for partially closing the boxes, sheet feeding mechanism to which the boxes are advanced by the carrier and by which sheets are inserted in the boxes, and means for closing the boxes after the sheets have been fed therein, substantially as described.

21. The combination of a carrier for advancing boxes with articles therein and with the sides of the boxes bent up into position and the ends and cover flaps of the boxes extended, sheet feeding mechanism to which the boxes are advanced by the carrier and by which sheets are inserted in the boxes, means for folding one end of each box and for partially closing the cover flap, means for folding the opposite end of the box to prevent displacement of the contents of the box while the first mentioned end is being folded, said means being formed to release said end of the box before the box is advanced to the sheet inserting mechanism, and means for again folding said end of the box when the box has been advanced beyond the sheet feeding mechanism; substantially as described.

22. The combination of a rotating carrier having a plurality of radially arranged box holders, sheet feeding mechanism to which the boxes are advanced by the carrier and by which sheets are fed into the boxes, said mechanism being arranged to feed the sheets edgewise radially of the carrier; substantially as described.

23. The combination of a carrier, a pusher by which boxes are advanced from the carrier and inserted into tubular covers, a member for bearing on the top of the box as the box is advanced by the pusher, and means for moving said member out of operative position before the box is inserted in the cover; substantially as described.

24. In a box covering mechanism, the combination of a pusher for advancing the boxes and inserting them in tubular covers, a member for bearing on the top of the box as the box is advanced by the pusher, and means for moving said member out of operative position before the box is inserted in the cover; substantially as described.

25. In a box covering mechanism, the combination of a reciprocating pusher for advancing the boxes to be covered, means for presenting tubular covers in the path of the boxes, a presser foot for bearing on the top of the box as the box is advanced by the pusher, said presser foot being mounted to move with the pusher and having a lost motion connection therewith, and means for raising said presser foot out of operative position as the pusher approaches the end of its movement in each direction; substantially as described.

26. The combination of the reciprocating pusher 298, means for moving boxes transversely of the direction of the movement of the pusher into position to be engaged by the pusher, means for presenting tubular covers in the path of the boxes as the latter are advanced by the pusher, presser foot 503 for bearing on the top of the boxes as the latter are advanced by the pusher, means for raising said presser foot from the boxes before the latter are inserted in the covers; substantially as described.

27. The combination of a reciprocating member, a pusher moving with said member to advance the boxes and insert them in tubular covers, a sliding presser foot having lost motion connection with said member, and cam 507 moving with said member and a stationary cam 512, for controlling the movements of said presser foot vertically into and out of operative position; substantially as described.

28. The combination of a carrier for advancing boxes sidewise, guides for holding the cover flaps of the boxes in folded position as the boxes are advanced by the carrier, means for delivering the boxes from the carrier, and means for correcting lateral displacement of the cover flaps of the boxes; substantially as described.

29. The combination of a carrier for advancing boxes sidewise, means for holding the cover flaps of the boxes in folded position as the boxes are advanced by the carrier, means for delivering the boxes endwise from the carrier, and means for correcting lateral displacement of the cover flaps of the boxes by engagement with one edge thereof; substantially as described.

30. The combination of a carrier for advancing boxes sidewise, means for holding the cover flaps of the boxes in folded position as the boxes are advanced by the carrier, means for delivering the boxes endwise from the carrier, and a tapping device for correcting lateral displacement of the cover flaps of the boxes before the boxes are fed from the carrier; substantially as described.

31. The combination of a carrier for advancing boxes sidewise, means for holding the cover flaps of the boxes in folded position as they are advanced by the carrier, means for delivering the boxes endwise from the carrier, a member for engaging the cover flaps to hold them in position during such delivery movement of the boxes, and means for correcting lateral displacement of the cover flaps of the boxes before said member is moved into operative position; substantially as described.

32. The combination with a carrier for advancing boxes sidewise, a guide for holding the cover flaps of the boxes in their folded position as the boxes are advanced by the carrier, pusher 298 for advancing the boxes from the carrier, and hammer 520 for tapping the edge of the cover flaps to correct lateral displacement thereof; substantially as described.

In testimony whereof, I have hereunto set my hand, in the presence of two subscribing witnesses.

BENJAMIN W. TUCKER.

Witnesses:
A. L. KENT,
T. F. KEHOE.